(12) United States Patent
Huckriede

(10) Patent No.: US 6,504,326 B2
(45) Date of Patent: Jan. 7, 2003

(54) FOCUSING CIRCUIT FOR A CATHODE RAY TUBE

(75) Inventor: Martin Huckriede, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 23 days.

(21) Appl. No.: 09/841,959

(22) Filed: Apr. 25, 2001

(65) Prior Publication Data

US 2002/0047668 A1 Apr. 25, 2002

(30) Foreign Application Priority Data

Jun. 8, 2000 (EP) .......................................... 00202029

(51) Int. Cl.⁷ ................................................. G09G 1/04
(52) U.S. Cl. ...................... 315/382; 315/382.1; 315/371
(58) Field of Search ............................. 315/382, 382.1, 315/371, 370, 368.21, 368.18

(56) References Cited

U.S. PATENT DOCUMENTS

| | | | |
|---|---|---|---|
| 5,162,705 A | 11/1992 | Golik | 315/382 |
| 5,430,358 A * | 7/1995 | George | 315/382 |
| 5,436,677 A * | 7/1995 | Suzuki et al. | 315/382 |
| 5,925,991 A * | 7/1999 | Fernsler | 315/382 |
| 6,215,258 B1 * | 4/2001 | Sakata et al. | 313/441 |
| 6,300,731 B1 * | 10/2001 | George | 315/382 |

FOREIGN PATENT DOCUMENTS

| | | | |
|---|---|---|---|
| EP | 2239148 | 6/1991 | ............ H01J/29/58 |
| EP | 0546595 A2 | 6/1993 | ............ H04N/3/26 |
| EP | 0546595 A3 | 6/1993 | ............ H04N/3/26 |
| EP | 0844787 A1 | 11/1997 | |
| EP | 0844787 | 5/1998 | ............ H04N/3/26 |
| EP | 0651564 | 8/1998 | ............ H04N/3/26 |
| JP | 07058975 A | 3/1995 | ............ H04N/3/26 |
| WO | WO9821883 | 11/1997 | |

* cited by examiner

*Primary Examiner*—Don Wong
*Assistant Examiner*—Tuyet T. Vo

(57) ABSTRACT

A focusing circuit (1) for generating a focus control signal for a cathode ray tube (3) has a modulation input (4) for influencing the focus control signal, which focus control signal contains a measure for an envelope of excursions of horizontal scan lines across the cathode ray tube. The focusing circuit (1) comprises a load control circuit (5) for influencing the focus control signal, and having a control input (6) coupled to the modulation input (4) for influencing the focus control signal by load control variation in dependence on a desired focus control signal modulation. The load control circuit (5) may comprise a current source and/or a voltage source and/or controllable impedance that have a control input for coupling to a modulation output of a synchronization processor (7). The focusing circuit (1) provides a parabolic control signal capable of correcting for dynamic cathode ray tube deviations and pin cushion effects, irrespective the graphical monitor or television mode applied in an image device.

9 Claims, 1 Drawing Sheet

FOCUSING CIRCUIT FOR A CATHODE RAY TUBE

BACKGROUND

The present invention relates to a focusing circuit for generating a focus control signal for a cathode ray tube, the focusing circuit having a modulation input for influencing the focus control signal, which focus control signal contains a measure for an envelope of excursions of horizontal scan lines across the cathode ray tube. The present invention also relates to a cathode ray tube and an image device, such as a monitor or television provided respectively with such a focusing circuit.

EP-A-0 546 595 discloses a circuit for focusing an electron beam generated in a cathode ray tube (CRT) having a television display screen. The known focusing circuit comprises a diode modulator circuit for generating a generally parabolic dynamic horizontal focus voltage control signal. The control signal is dynamic in that a voltage that varies with the angle of deflection of the horizontal electron beam is added to a static focus voltage applied to said beam. It is parabolic in shape because the magnitude of the voltage has to increase—due to a defocusing effect emanating from the cathode ray tube—in order to fully cover focused east and west edges of the screen in particular at the north and south parts thereof. This defocusing effect can be corrected.

There is however a second effect known as the pin cushion effect. This is the effect—as also described in the prior art above—that without correction the scan lines in the center of the screen are shorter in length than the scan lines in the north and south parts of the screen. In order to compensate for the pin cushion effect the horizontal deflection current of a scan line is made depend on its distance to the center of the screen. If however the dynamic focus control signal is derived from the deflection current such as by integration over time, a combined effect occurs and the control signal is modulated undesirably. In the mentioned prior art this undesirable modulation in the focus control signal is magnetically compensated in a specially devised transformer.

However the prior art compensation does not work satisfactory for a cathode ray tube which has to be capable of working in multiple different display monitor and/or television modes used at present, such as Hercules, MONO, EGA, CGA, VGA, S-VGA, PAL, HDTV etcetera having different resolutions, line numbers and line rates, and all requiring a specific focus control signal modulation.

SUMMARY

Therefore it is an object of the present invention to provide a focusing circuit which has a broadened application area, and which is capable of at least partly compensating for said negative effects in cathode ray tubes capable of working in plural different modes.

Thereto the focusing circuit according to the invention is characterized in that the focusing circuit comprises a load control means which is embodied for influencing the focus control signal, and that the load control means have a control input coupled to the modulation input for influencing the focus control signal by load control variation in dependence on a desired focus control signal modulation.

It is an advantage of the focusing circuit according to the present invention that it consumes a limited amount of power and that by connecting an easy to implement load control means to the uncorrected and uncompensated focus control signal, at wish both aforementioned effects in a cathode ray tube working in any kind of mode can be compensated, without bulky and specially manufactured and devised means, such as a transformer. The desired influence for the modulation input can simply be taken from a synchronization or deflection processor present in any image device, such as monitor or television. Advantageously the functioning of the focusing circuit according to the present invention is independent of the graphics mode applied on a monitor device or television device. Thus the working area of such devices is no longer restricted since these devices are now capable of working properly in any graphics monitor or television mode desired. In addition the focus control no longer depends on the way the negative effects mentioned above are being compensated. Furthermore a large degree of freedom regarding the control of the horizontal parabola is possible which gives way to additional design freedom in the focusing circuit and image device according to the invention.

An embodiment of the focusing circuit according to the invention is characterized in that the load control means comprises a current source and/or a voltage source and/or a controllable impedance that have a control input for coupling to a modulation output of a synchronization processor.

It is an advantage of the focusing circuit according to the invention that at wish a controllable current and/or voltage and/or controllable impedance can be used in the load control circuit to control the focus control signal adequately.

A further embodiment of the focusing circuit according to the invention is characterized in that the controllable impedance comprises an inductive and/or capacitive and/or semiconductor circuit coupled to any of said respective sources.

Advantageously in a further embodiment of the focusing circuit according to the present invention the impedance may be provided with readily available components such as capacitance components and/or inductance components and/or semiconductor components.

A following cost effective and easy to manufacture embodiment of the focusing circuit according to the invention is characterized in that the controllable impedance is embodied by at least one controllable semiconductor.

A still further embodiment of the focusing circuit according to the invention is characterized in that the controllable impedance comprises a series arrangement of two capacitors, and a field effect transistor having a main current path coupled to the connection point of said capacitors, and a control input coupled to the modulation output of the synchronization processor. This embodiment though effective only comprises a minimum number of components.

If necessary for reversing the phase of the modulation control signal a reverse circuit is coupled between the synchronization processor and the control input of the load control means.

BRIEF DESCRIPTION OF THE FIGURES

At present the focusing circuit, cathode ray tube and image device according to invention will be elucidated further together with their additional advantages while reference is being made to the appended drawing, wherein similar components are being referred to by means of the same reference numerals. In the drawing.

DETAILED DESCRIPTION

Figure 1:
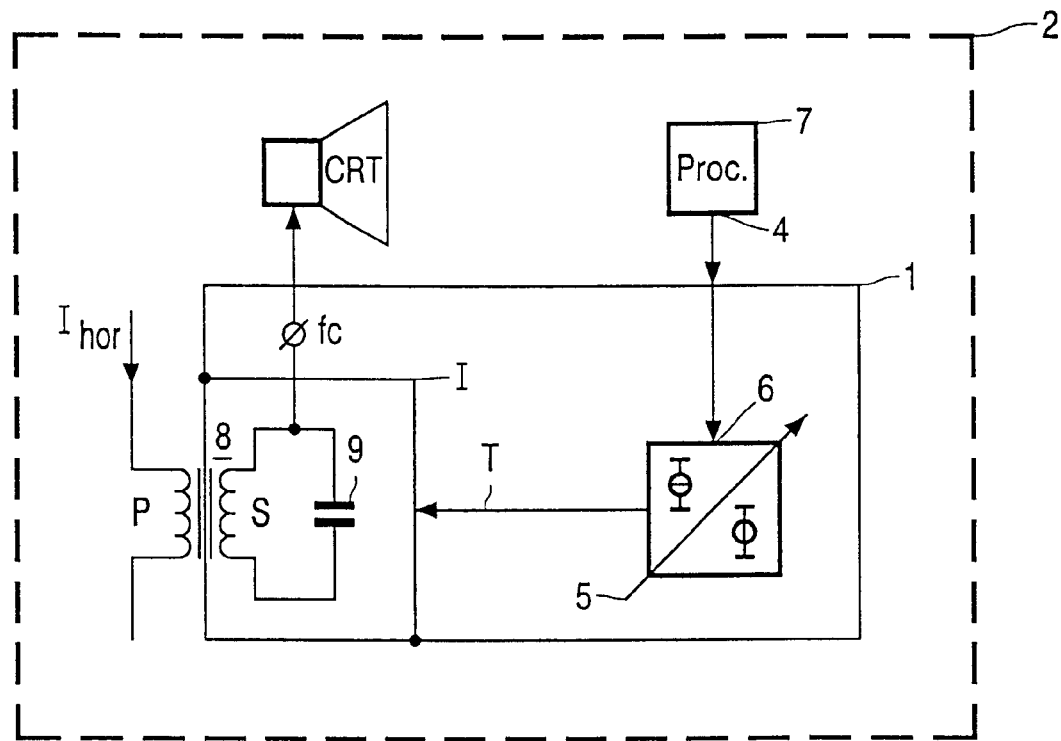
FIG. 1 shows a general outline of possible embodiments of the focusing circuit according to the present invention.

FIG. 1 shows a focusing circuit 1 as used in an image display device, for example a monitor or television 2, for generating a focus control signal fc to be applied to a grid, such as the G3b grid of a cathode ray tube 3. The focusing circuit 1 has a modulation input 4 for influencing/modulation of the focus control signal fc. The focus control signal fc contains a measure for an envelope of excursions of horizontal scan lines across the cathode ray tube image. Or, said in other words, the control signal is in the form of an envelope of excursions of horizontal scan lines. The amplitude of the focus control signal has an envelope which depends on the amplitude of the horizontal deflection current which depends on the vertical position on the display screen. The focusing circuit 1 comprises a load control circuit 5. Embodiments of the load control circuit 5 will be elucidated hereafter. The load control circuit 5 has a control input 6 coupled to the modulation input 4 of the focusing circuit 1. The modulation signal on input 4 varies the measure for said envelope of excursions of horizontal scan lines across the cathode ray tube 3 in order to cover the full screen of the tube 3 in a well focused way. In particular the modulation is varied by load variations created in the load control circuit 5. The load variations depend on the modulation or influence desired for the focus control signal fc. Each image device, such as monitor or television, or a device combining the monitor or television functions has some synchronization or deflection or timing processor 7 providing a generally parabolic modulation input signal on input 4. If necessary this input signal may be inverted or reversed in sign in order to make it suitable for the control purpose concerned.

FIG. 1 shows that a horizontal deflection current Ihor flows through the primary winding P of a so called DAF transformer 8, whose secondary winding S is coupled to a parallel capacitor 9, wherefrom the focus control signal fc is derived. Further details of the focusing circuit 1 and the defocusing and other negative effects described in the preamble here before are clearly outlined in applicants EP-A-0 546 595, which is supposed to be incorporated herein by reference thereto.

The load control circuit 5 used to control the signal fc for compensation of one or more of the negative effects mentioned earlier may comprise a current source and/or a voltage source and/or a controllable impedance that may have its control input coupled to the modulation input 4 of the focusing circuit 1. Basically there are several different ways of driving the impedance circuit combination S and 9. One is by way of current driving the other by way of voltage driving. The former will be explained while reference is made to FIG. 2. In case of voltage driving the voltage source applies a voltage on terminal T of impedance circuit I, which depends on the desired modulation of the focus control signal. The voltage is then used to influence the focus control signal fc. This may be achieved by inductively coupling said voltage to the transformer 8. A further way of achieving the wanted influence on the signal fc is by applying some kind of controllable impedance, whose impedance varies such that combined with the impedance circuit combination S and 9 fc varies as required. If high voltage resistant some kind of semiconductor or semiconductor arrangement could be used for that purpose. Also if high voltage resistant a varicap could be used, whose capacitance varies as required for influencing the control signal fc accordingly. In these further cases the load control unit acting as controllable impedance may be partly integrated in the impedance circuit I.

Figure 2:
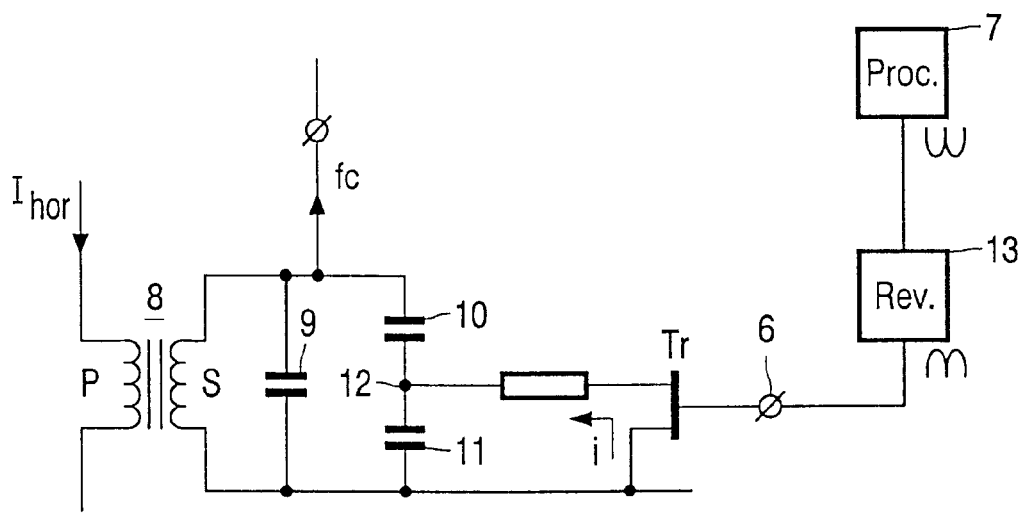
FIG. 2 shows a detailed embodiment of the focusing circuit according to the invention.

FIG. 2 shows a more detailed embodiment of the focusing circuit wherein capacitive components 10, 11 in a series arrangement in the impedance circuit 1 are coupled parallel to the combination S and 9, and wherein an AC current i is applied to the connection point 12 of the components 10, 11 from a current source. This current source is embodied with a field effect transistor (FET) Tr and used to influence the focus control signal fc in dependence on the modulation input signal on input 4. In this case the current i—flowing in or out of the main stream path of the FET, which may be a high voltage FET for example a MOSFET—is controlled by a gate control signal, which is the inverse—through an inverse circuit 13—from the modulation signal provided by the deflection processor 7.

Whilst the above has been described with reference to essentially preferred embodiments and best possible modes it will be understood that these embodiments are by no means to be construed as limiting examples of the devices concerned, because various modifications, features and combinations of features falling within the scope of the appended claims are now within reach of the skilled person. It should thus be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The invention can be implemented by means of hardware comprising several distinct elements, and by means of a suitably programmed computer. In the device claim enumerating several means, several of these means can be embodied by one and the same item of hardware. The mere fact that certain measures are recited in mutually different dependent claims does not indicate that a combination of these measures cannot be used to advantage.

What is claimed is:

1. A focusing circuit for generating a focus control signal for a cathode ray tube, the focusing circuit having a modulation input for influencing the focus control signal, characterized in that the focusing circuit comprises a load control means for influencing the focus control signal, and that the load control means have a control input coupled to the modulation input for influencing the focus control signal by load control variation in dependence on a desired focus control signal modulation, and a controllable impedance circuit and a switch that responds to a modulation signal at the control input by applying an AC signal to the controllable impedance circuit.

2. An image display device, such as a monitor or television, comprising a cathode ray tube provided with a focusing circuit according to claim 1.

3. A focusing circuit as claimed in claim 1, wherein the load control means include a controllable impedance having a control input for coupling to a modulation output of a synchronization processor, and includes a series arrangement of two capacitors, and a field effect transistor having a main current path coupled to a connection point of said capacitors.

4. A focusing circuit as claimed in claim 1, characterized in that the load control means includes at least one of: a current source and a voltage source, and a controllable impedance having a control input for coupling to a modulation output of a synchronization processor.

5. A focusing circuit as claimed in claim 4, characterized in that the controllable impedance includes at least one of: an inductive circuit, a capacitive circuit, and a semiconductor circuit coupled to said source.

6. A focusing circuit as claimed in claim 5, characterized in that the controllable impedance is embodied by at least one controllable semiconductor.

7. A focusing circuit as claimed in claim 6, characterized in that the controllable impedance comprises a series arrangement of two capacitors, and a field effect transistor having a main current path coupled to a connection point of said capacitors, and a control input coupled to the modulation output of the synchronization processor.

8. A focusing circuit for generating a focus control signal for a cathode ray tube, the focusing circuit having a modulation input for influencing the focus control signal, characterized in that the focusing circuit comprises a load control means for influencing the focus control signal, and that the load control means have a control input coupled to the modulation input for influencing the focus control signal by load control variation in dependence on a desired focus control signal modulation, the focus control signal including a measure for an envelope of excursions of horizontal scan lines across the cathode ray tube.

9. A focusing circuit for generating a focus control signal for a cathode ray tube, the focusing circuit including:

a modulation input for influencing the focus control signal;

a load control means having a control input coupled to the modulation input for influencing the focus control signal by load control variation in dependence on a desired focus control signal modulation; and a reverse circuit coupled between the synchronization processor and the control input of the load control means.

* * * * *